Jan. 17, 1939.   H. A. CENTERVALL   2,143,859
CONTROL MEANS FOR POWER OPERATED DEVICES
Filed Jan. 16, 1936

INVENTOR.
Hugo A. Centervall
BY
Pennie, Davis, Marvin and Edmonds
His ATTORNEYS.

Patented Jan. 17, 1939

2,143,859

UNITED STATES PATENT OFFICE 2,143,859

CONTROL MEANS FOR POWER OPERATED DEVICES

Hugo A. Centervall, Brooklyn, N. Y., assignor to Manly Corporation, New York, N. Y., a corporation of Delaware Application January 16, 1936, Serial No. 59,417

19 Claims. (Cl. 180—79.2)

This invention relates to control mechanisms for power operated devices and more particularly to control mechanisms for power devices employed to actuate the steering apparatus of a motor vehicle.

The principal object of the invention is to provide an improved mechanism of this class that is simple, sturdy, compact and reliable in action. Further objects are to provide an improved mechanism of this class which may be readily applied in connection with conventional steering gears for automobiles and which, if desired, may be conveniently located beneath the hood of a conventional automobile. Other and more specific objects will appear from the following description of an illustrative embodiment of the invention shown in the accompanying drawing.

In devices of this character, such, for example, as steering gears, it is important to be able to operate the device manually (for example, steer by hand), should the power mechanism fail for any reason. One of the problems in devising such apparatus is to provide for the proper actuation of the control member (valve, switch or other element) of the power mechanism without interfering with the manual operation of the device. Another problem in devising such apparatus, particularly power steering apparatus for motor vehicles, is to incorporate the additional elements necessary for accomplishing power steering without elaborate changes in the manual steering mechanisms now in use and accepted as standard equipment. These problems have been very effectively solved by the present invention. Not only is the operation of the manual steering substantially unaffected by the power device control mechanism actuating means of the present invention, but the invention also enables a favorite standard type of steering mechanism to be employed, and requires the addition thereto of an extremely small number of parts.

The invention is suitable for use in controlling the operation of any preferred type of power apparatus such as those operated pneumatically, electrically, mechanically or hydraulically. I have, however, chosen to illustrate the invention in connection with an hydraulic steering apparatus for a conventional automobile, but its use is not limited to this type of power operated means or for this particular purpose.

Figure 1:
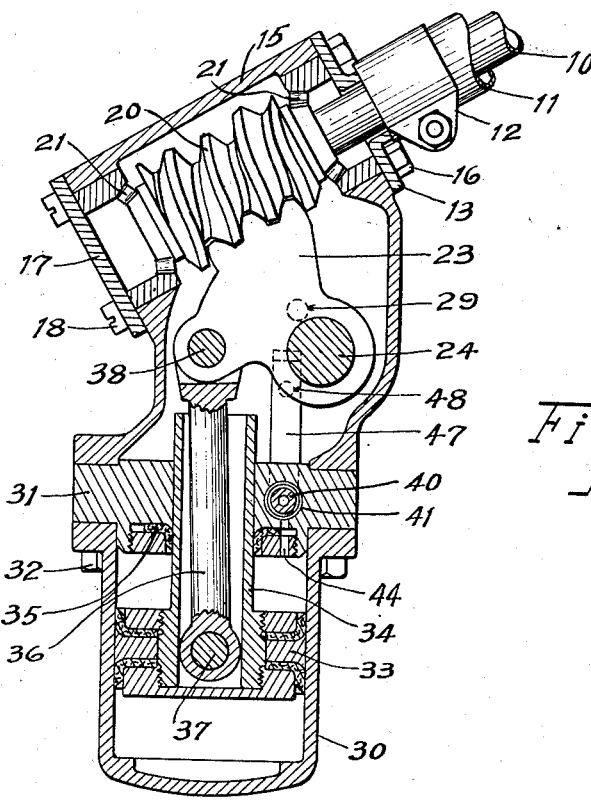
Fig. 1 is a side view partly in section showing a preferred embodiment of the invention as applied to the steering apparatus for a conventional automobile.

Referring now to Fig. 1 of the drawing, the steering gear includes the usual rotatable shaft 10 to whose upper end is attached the usual steering wheel, not shown, by which said steering shaft 10 is manually turned to control the steering of the vehicle. The steering shaft 10 is enclosed within the usual hollow steering post 11 whose lower end is supported by and appropriately secured, as by the fastening means 12, to the top cover member 13 which closes the upper end of the steering gear casing 15 and on which it is held in place as by the screws 16. The lower end of the steering gear casing 15 is closed by the bottom cover member 17 which is fastened to said steering casing, as by the screws 18.

The lower end of the steering shaft 10 extends into the steering gear casing 15 and is received within the central bore of the worm member 20, hereinafter termed the "worm", by which it is supported and to which it is appropriately keyed for simultaneous rotation therewith in the usual manner. The worm 20 is rotatably supported on each of its ends by suitable bearing members 21 whose outer races are received within appropriate bores formed in the steering gear casing 15 and which are held in position by the cover members 13 and 17 respectively.

The worm 20 is formed with the usual worm or helical thread which meshes with the usual worm gear or sector 23 carried by and securely fastened to one end of the cross shaft 24. The sector 23 and the cross shaft 24 are employed for transmitting power to other parts of the steering apparatus.

When the worm is rotated, the worm gear or sector is also rotated, and at the same time the sector is moved axially due to the axial thrust occasioned by the angularity of the worm thread and the worm gear teeth. The direction of this thrust is reversed if the direction of rotation of the worm is reversed, and, in accordance with my present invention, I make use of this axial thrust and movement of the worm gear or sector to actuate the control mechanism of the power device when steering is done by power. Either the sector or the cross shaft 24, or both are employed for actuating the control mechanism.

Figure 2:
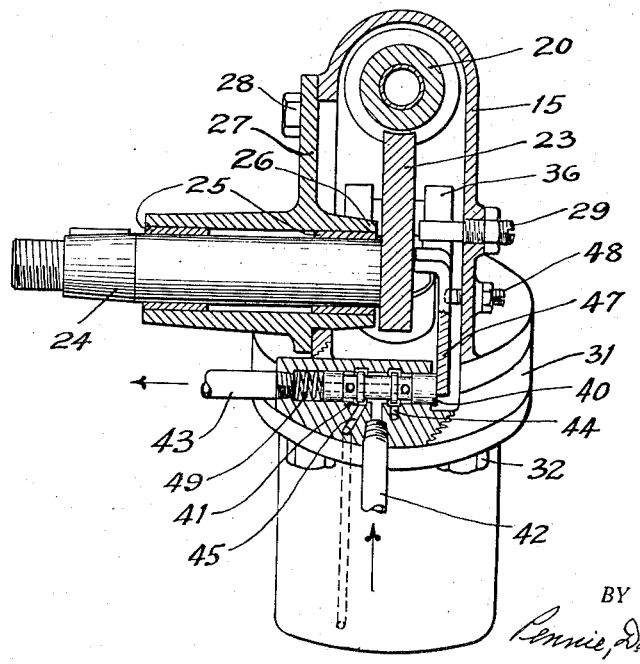
Fig. 2 is a view partly in perspective and partly in section taken at right angles to the section of Fig. 1 showing the worm and worm gear sector in section, the construction and support of the cross shaft and the valve operating lever, and showing the control valve and power apparatus in partly schematic arrangement.

For this purpose the cross shaft 24 and the attached sector 23 are in the present instance rotatably mounted but are adapted to be moved axially a limited distance determined by suitable stops. As shown in Fig. 2, the cross shaft 24 is rotatably supported by appropriate bearing elements 25 in the hub 26 of the side cover member 27 which is carried by the steering gear casing 15 and to which it is appropriately fastened as by the screws 28. The arrangement is such that the cross shaft 24 and its attached sector 23 are freely rotatable but are adapted to be moved axially, the inner end of the hub 26 and the adjustable screw 29 acting as stops which limit said axial movement of said parts.

The outer end of the cross shaft 24 is presumed to be connected in the usual manner with a conventional front road wheel assembly of an automobile so that clockwise rotation of said cross shaft 24, as viewed in Fig. 1, moves the front road wheels so as to cause the vehicle to turn toward the left, while counter-clockwise rotation of said cross shaft 24 moves these wheels so as to cause the vehicle to turn toward the right.

The power apparatus in the present embodiment is hydraulically operated and as here shown comprises a cylinder 30 closed at its lower end and provided with a cover member 31 which closes its upper end. The cylinder assembly is securely fastened to the steering gear casing 15 as by the screws 32. Slidably fitted within the cylinder 30 is a double acting piston 33 from the upper end of which projects a tubular stuffing box 34. The stuffing box 34 extends through an appropriate opening in the cover 31 and is of such length as to close said opening in all positions of the piston 33. The arrangement is such that the stuffing box 34 is free to move lengthwise through the opening in the cover 31 while forming a substantially fluid-tight fit therewith, appropriate packing 35 being used to prevent leakage. Within the stuffing box 34 is a connecting rod 36 whose lower end is pivotally connected with the piston 33 as at 37. The upper end of the connecting rod 36 may be connected with any appropriate part of the steering apparatus; in the present instance said upper end, here shown as forked, is pivotally connected with the sector 23, as by the pin 38, the arrangement being such that the sector 23 is free to move axially on said pin 38.

The valve mechanism for controlling the operation of the hydraulic power apparatus may be of any suitable type and a valve of the "open circuit" type is here chosen for purposes of illustration. It includes a valve member 40 slidably fitted with an appropriate valve bore 41 formed in the cover member 31, as shown in Figs. 1 and 2. The valve bore 41 is suitably connected with a source of pressure fluid, not shown, as by the pipe 42 which connects with one end of a short passage in the cover member 31 leading to and connecting with said valve bore 41. The valve bore 41 is also connected with a return or exhaust pipe 43 which in the present instance is shown as connected with the left end of said valve bore, as viewed in Fig. 2.

The fluid circuit also includes an appropriate port and passage, broadly designated by the numeral 44, which connects the valve bore 41 with the upper end of the hydraulic cylinder 30 and said fluid circuit further includes a port and passages, broadly designated by the numeral 45, which connect said valve bore with the lower end of said cylinder 30. The arrangement is such that the control valve 40, when in its neutral position as shown in Fig. 2, permits pressure fluid entering the valve bore 41 through the pipe 42 to pass out through the exhaust pipe 43, and at the same time connects both ends of the cylinder 30 with the fluid thus by-passed. If the control valve 40 is moved toward the left, as viewed in Fig. 2, the lower end of the cylinder 30 is progressively disconnected from the exhaust pipe 43 and its connection with the pressure fluid inlet pipe 42 is correspondingly increased until it is finally connected only with said pipe 42.

The upper end of the cylinder 30 is at the same time progressively disconnected from the pressure fluid inlet pipe 42 and its connection with the exhaust pipe 43 is correspondingly increased until it is finally connected only with said exhaust pipe 43. The by-passing connection for the pressure fluid entering the valve bore 41 is thus progressively decreased until finally said pressure fluid is connected only with the lower end of the cylinder 30. The force thus exerted upon the piston 33 by the pressure fluid will move said piston and its connected parts upwardly. Similarly, if the control valve 40 is moved out of its neutral position and toward the right, as viewed in Fig. 2, the previously described connections will be reversed and the piston 33 will be moved downwardly.

In accordance with the present invention, movement and position of the control valve 40 are effected and controlled by axial movement and position of the sector 23 and its attached cross shaft 24. For this purpose the right end of the sector 23, as viewed in Fig. 2, is adapted to slidably bear against one end of the valve operating lever 47 which is pivotally supported intermediate its ends as upon the adjustable screw mounting 48, here shown as carried upon the steering gear casing 15. The other end of the valve operating lever 47 bears against one end of the control valve 40. The control valve 40 is adapted to be moved lengthwise in the valve bore 41 and, as viewed in Fig. 2, movement toward the left is effected by force exerted upon it by the valve operating lever 47. Movement of the control valve 40 toward the right, as viewed in Fig. 2, is effected by a spring 49 acting upon the adjacent end of the control valve 40. The spring 49 is adapted to move the control valve 40 toward the right as far and as rapidly as permitted by the control valve lever 47, and the spring 49 also serves to continuously hold the parts in proper position with respect to each other; that is, the control valve 40 is held against one end of the control valve lever 47 and the other end of said control valve lever 47 is held against the sector 23.

When it is desired to steer the vehicle toward the left, the driver turns the steering wheel in a counter-clockwise direction which imparts like motion to the steering shaft 10 and the worm 20. The worm thread on the worm 20 acting against the teeth of the sector 23 exerts a force which moves the sector 23 and its attached cross shaft 24 axially toward the right. The valve operating lever is thus swung on its pivot 48 so that it moves the control valve 40 toward the left, as viewed in Fig. 2, establishing a progressively increasing connection between the pressure fluid inlet 42 and the lower end of said cylinder and at the same time establishing a progressively increasing connection between the upper end of said cylinder 30 and the return pipe 43, as hereinbefore explained. The proportion of the parts is made such that this movement of the control valve 40 occurs before the sector 23 and the cross shaft 24 are moved an axial distance sufficient to bring said sector into contact with the adjustable screw 29 which acts as a stop. The fluid pressure thus exerted upon the piston 33 moves said piston and its connected parts upwardly, causing the sector 23 and the cross shaft 24 to turn in a clockwise direction, as viewed in Fig. 1. As hereinbefore explained the cross shaft is presumed to be so connected with the front road wheels of the vehicle that this clockwise rotation of said cross shaft 24 causes said front road wheels to swing so as to turn the vehicle toward the left.

The piston 33 and its connected parts continue to move upwardly as long as the driver continues to turn the steering wheel in a counter-clockwise direction. The clockwise movement of the sector 23 tends to set up a reaction of its teeth against the worm thread of the worm 20 which causes said sector 23 and its attached cross shaft 24 to be moved axially toward the left, as viewed in Fig. 2. The axial position of the sector 23 and the cross shaft 24 is therefore determined by the relative speeds and direction of rotation of the worm 20 and the sector 23 and this position in turn controls the position of the valve operating lever 47 and the control valve 40. There is consequently substantially no axial movement of the sector 23 and the cross shaft 24 as long as the steering wheel is turned in a counter-clockwise direction at a rate which imparts to the worm 20 a speed corresponding to the rate of movement of the sector 23. Hence there is substantially no movement of the control valve 40 and the piston 33 continues its upward movement. But whenever the speed of the sector 23 exceeds the speed of the worm thread on the worm 20, as when the driver turns the steering wheel more slowly or ceases to turn it, the sector 23 acts against the worm thread and moves said sector 23 toward the left, as viewed in Fig. 2. As the sector 23 and its connected cross shaft 24 move axially toward the left, it permits the valve operating lever 47 to swing on its pivot so that its arm adjacent the control valve 40 moves toward the right, as viewed in Fig. 2, and the movement of said parts is almost immediately effected by the spring 49.

A follow up action is thus set up, so that when the driver stops turning the steering wheel the control valve 40 immediately returns to its neutral position and movement of the piston 33 and its connected parts ceases.

To steer the vehicle toward the right the driver turns the steering wheel in a clockwise direction and the operation of the controls, the piston 33 and its connected parts is obviously reversed. Pressure fluid now acts upon the piston 33 so as to move it downwardly.

Steering is thus effected by power and it is necessary for the driver to expend only enough energy to move the control members. In most cases this will be negligible inasmuch as it is merely necessary to overcome the frictional resistance to axial movement of the sector 23 and the cross shaft 24, which may obviously be varied as desired within practical limits. While the movements of the various parts have been described progressively, it will be understood that these movements take place so rapidly that they are substantially instantaneous.

It will be understood from the foregoing that there is a definite vertical position of the piston 33 for every position of the steering control members and the device operates to continuously maintain this corresponding position. For purposes of illustration let us assume that the parts are in the position shown in Fig. 1, that the steering shaft 10 is stationary and that the piston 33 is displaced upwardly, because of leakage from the upper end of the cylinder 30, for example. As this displacement of the piston 33 commences, the sector 23 is moved in a clockwise direction and its teeth acting against the worm thread of the worm 20 moves said sector 23 and its cross shaft 24 axially toward the left, as viewed in Fig. 2. The control valve 40 is thus moved toward the right, as viewed in Fig. 2, admitting pressure fluid to the upper end of the cylinder 30 which almost instantaneously moves the piston 33 downwardly and restores it to its proper position, the control valve 40 likewise being restored to its neutral position by the follow up action already described. It is therefore impossible for the piston 33 to be displaced any material distance away from its proper position and any displacement that may occur is almost instantaneously rectified.

If the source of pressure fluid should fail, or if for any reason the power apparatus should not respond, steering may be effected manually by the same movement of the controls already described for power steering although the driver must obviously exert more energy. In this case the operation of the control members is initially the same as for power steering, but when the power apparatus fails to respond and to produce the follow up action, the sector 23 and the cross shaft 24 continue their axial movement until said sector 23 strikes either the inner end of the hub 26 or the adjustable screw 29, as the case may be. Further axial movement of the sector 23 and the cross shaft 24 is thus prevented and manual power from the steering wheel may be transmitted to the front road wheels in the same manner as in a conventional steering gear adapted for manual operation only. When the steering is done manually the entire load resulting from the axial thrust exerted upon the sector 23 and the cross shaft 24 is taken either by the inner end of the hub 26 or the adjustable screw 30. No work of steering is done by the valve operating lever 47 or the control valve 40 at any time, regardless of whether steering is effected by power or manually; the only pressure ever exerted on these parts is the very small amount necessary to effect the movement, which is determined by the spring 49, their function being limited to the control of the operation of the hydraulic apparatus.

It will be observed that axial movement of the sector 23 and the cross shaft 24 is effected by the reaction of the teeth of said sector 23 against the worm thread on the worm 20. The axial movement of the sector 23 in actual practice is a relatively small distance and need be no greater than that frequently encountered in many present steering gear mechanisms. It will also be observed that the force exerted by the worm upon the sector is resolved into a force acting in the plane of rotation of said sector and an axial force which is here utilized to operate the control mechanism. In present conventional steering gears this axial force is considerably less than the force acting in the sector's plane of rotation, their relation varying substantially in accordance with the steering gear ratio and in most instances the axial force is from one-tenth to one-twentieth of the total force. Only a small part of the shock or force is, therefore, transmitted to the control mechanism when steering is done by power or is transmitted to the stops limiting the axial movement of the sector 23 and the cross shaft 24 when steering is done manually.

A further feature of the invention is the fact that the total axial movement of the cross shaft 24 and the sector 23 may readily be varied by movement of the adjustable screw 29 and if preferred, an adjustable mechanism may be substituted for the inner end of the hub 26. Similarly, the pivotal support 48 of the valve operating lever 47 is adjustable so that the control apparatus may be easily adjusted and the position of the control valve 40 may be easily varied with respect to the axial position of the sector 23 and the cross shaft 24. The adjustment of these parts may be made from the exterior of the steering gear casing 15 and in almost all instances the needed adjustments can be effected without disturbing the steering gear casing or any part of the steering gear mechanism. The valve operating lever 47 also makes it possible to provide any desired ratio between the axial movement of the sector 23 and the cross shaft 24 with respect to the linear movement of the control valve 40 and in the present instance it will be observed that the axial movement of said cross shaft 24 and sector 23 is multiplied by the valve operating lever 47.

It is to be understood that the above is merely an exemplifying disclosure and that changes may be made in the apparatus without departing from applicant's invention which is defined in the appended claims. Thus, for example, the steering gear illustrated herein is of the worm and sector type, but if desired, steering gears of other appropriate types, such as the worm and roller type, may be used. Also the worm member illustrated herein is of the conventional "hour-glass" type. This worm may have either a constant or a varying pitch. Moreover, worm members having a uniform diameter and of either constant or varying pitch may be employed. It is to be understood, therefore, that the terms "worm" and "worm member", as used in this specification and the appended claims, are intended to include the driving member of a steering gear of these and other equivalent types and that the terms "sector" and "worm gear" are intended to include a driven member suitable for use therewith.

Although the power-operated device of the present invention has been disclosed in connection with a steering apparatus for automobiles, it will be understood that the invention can be employed, if desired, with steering apparatus for boats, such, for example, as motor boats.

I claim:

1. In a device of the class described, a worm, a sector coacting with said worm, power-operated means operatively connected with said sector, and mechanism for controlling said power-operated means actuated to make said power-operated means operative by movement of said sector in one direction and actuated by movement of said sector in the opposite direction responsive to operation of said power-operated means to render said power-operated means inoperative.

2. In a device of the class described, a worm, a sector engaging said worm and having limited axial motion, power-operated means operatively connected with said sector, and mechanism for controlling said power-operated means actuated by said axial motion of said sector.

3. In a device of the class described, a manually rotatable driving member, a driven member engaging said driving member, said driven member being rotatably mounted and having limited axial movement, power-operated means for actuating said driven member, and control mechanism for said power-operated means actuated by axial movement of said driven member.

4. In a power-operated steering mechanism, a worm, a sector engaged by the worm, said sector having limited axial motion, steering means connected to the sector, fluid power-operated means operatively connected with said steering means, and a valve for controlling the operation of said fluid power-operated means actuated by axial motion of said sector.

5. In a device of the class described, a manually rotatable driving member, a driven member engaging said driving member, said driven member being rotatably mounted and having limited axial movement, power-operated means for actuating said driven member, control mechanism for said power-operated means actuated by axial movement of said driven member, and stops for limiting the axial movement of said driven member whereby manual power may be transmitted.

6. In a steering mechanism, a worm, a rotatably mounted cross shaft having limited axial motion, a sector carried by said cross shaft and engaging said worm, steering means connected with said cross shaft, power-operated means operatively connected with said steering means, and mechanism for controlling the operation of said power-operated means actuated by axial movement of said cross shaft and said sector.

7. In a device of the class described, a driving member, a driven member engaging said driving member, said driven member being movable in one direction for the transmission of power and having limited motion in another direction, power-operated means for actuating said driven member and mechanism for controlling said power-operated means actuated by movement of said driven member in its direction of limited motion.

8. In a steering device, a worm, a sector engaging said worm and having limited axial motion, steering means connected with said sector, fluid power-operated means for actuating said steering means, a valve for controlling said power-operated means, said valve being actuated by axial motion of said sector, and adjustable means for varying the position of said valve with respect to the relative axial position of said sector.

9. In a steering device, a worm, a sector engaging said worm and having a path of limited motion, steering means connected with said sector, power-operated means for actuating said steering means, mechanism for controlling said power-operated means actuated by movement of said sector, in its path of limited motion, a casing enclosing said sector and said control mechanism, said control mechanism including a member adjustable from the exterior of said casing for altering the position of said control mechanism with respect to the position of said sector in its path of limited motion.

10. In a steering device, a worm, a sector engaging said worm and having limited axial motion, steering means connected with said sector, power-operated means for actuating said steering means, mechanism for controlling said power-operated means actuated by said axial motion of said sector, a casing enclosing said worm and said sector, and means adjustable from the exterior of said casing for varying the amount of said axial motion of said sector.

11. In a device of the class described, a driving member, a rotatable driven member having limited axial motion, said driving member engaging said driven member in a power transmitting relation whereby one force is exerted upon said driven member in its plane of rotation and another force is exerted axially upon said driven member, power-operated means connected with said driven member and control mechanism for said power-operated means actuated solely by axial force exerted upon said driven member.

12. In a power operated steering mechanism; a worm, a sector engaged by the worm, said sector having limited axial motion, steering means connected to the sector, power operated means operatively connected with said steering means, and mechanism for controlling the operation of said power operated means actuated by axial motion of said sector.

13. In a steering mechanism, a worm, a rotatably mounted cross shaft having limited axial motion, a sector carried by said cross shaft and engaging said worm, steering means connected with said cross shaft, fluid power operated means operatively connected with said steering means, and a valve for controlling said power operated means actuated by axial movement of said cross shaft and said sector.

14. In a steering device, a manually rotatable driving member, a driven member engaging said driving member, said driven member being rotatably mounted and having limited axial movement, steering means operatively connected with said driven member, power operated means for actuating said steering means, mechanism for controlling said power operated means actuated by axial motion of said driven member, and adjustable means for varying the position of said control mechanism with respect to the axial position of said driven member.

15. In a steering device, a manually rotatable driving member, a driven member engaging said driving member, said driven member being rotatably mounted and having limited axial movement, steering means connected with said driven member, power operated means for actuating said steering means, mechanism for controlling said power operated means actuated by axial motion of said driven member, said control mechanism including a member adjustable for altering the position of said control mechanism with respect to the axial position of said driven member.

16. In a steering device, a manually movable member, a driven member coacting therewith, one of said members having lost motion with respect to the other, steering means connected with said driven member, a fluid pressure cylinder having a piston therein operatively connected to said steering means and to said driven member, a valve for controlling said cylinder arranged to normally admit fluid pressure to both sides of said piston, said piston and said valve being unbalanced thereby each tending to move in a given direction when equal pressures are applied to the opposite sides thereof, and connecting means between said valve and said driven member to cause the operation of said valve by the lost motion of said driven member, said connecting means being arranged so that the force due to the unbalancing of said valve opposes the force due to the unbalancing of said piston.

17. In a steering device, a manually movable worm member, a driven member coacting therewith, one of said members having lost motion with respect to the other, steering means operatively connected with said driven member, power operated means for actuating said steering means, control mechanism for said power operated means actuated by the driven member during the occurrence of said lost motion.

18. In a steering device, a manually movable worm member, a driven member coacting therewith, one of said members having lost motion with respect to the other, steering means operatively connected with said driven member, power operated means for actuating said steering means, control mechanism for said power operated means, an actuator therefor actuated by the driven member during the occurrence of said lost motion, and means for adjusting the actuator with respect to said control mechanism.

19. In a steering device, a manually rotatable worm member, a driven member engaging said worm member and having a path of limited motion, steering means connected with said driven member, power operated means for actuating said steering means, and mechanism for controlling said power operated means actuated by movement of said driven member in its path of limited motion.

HUGO A. CENTERVALL.